April 25, 1967 KATSUJI HIRAHARA 3,315,589
PELLET FORMING APPARATUS
Filed Oct. 21, 1965
2 Sheets-Sheet 1
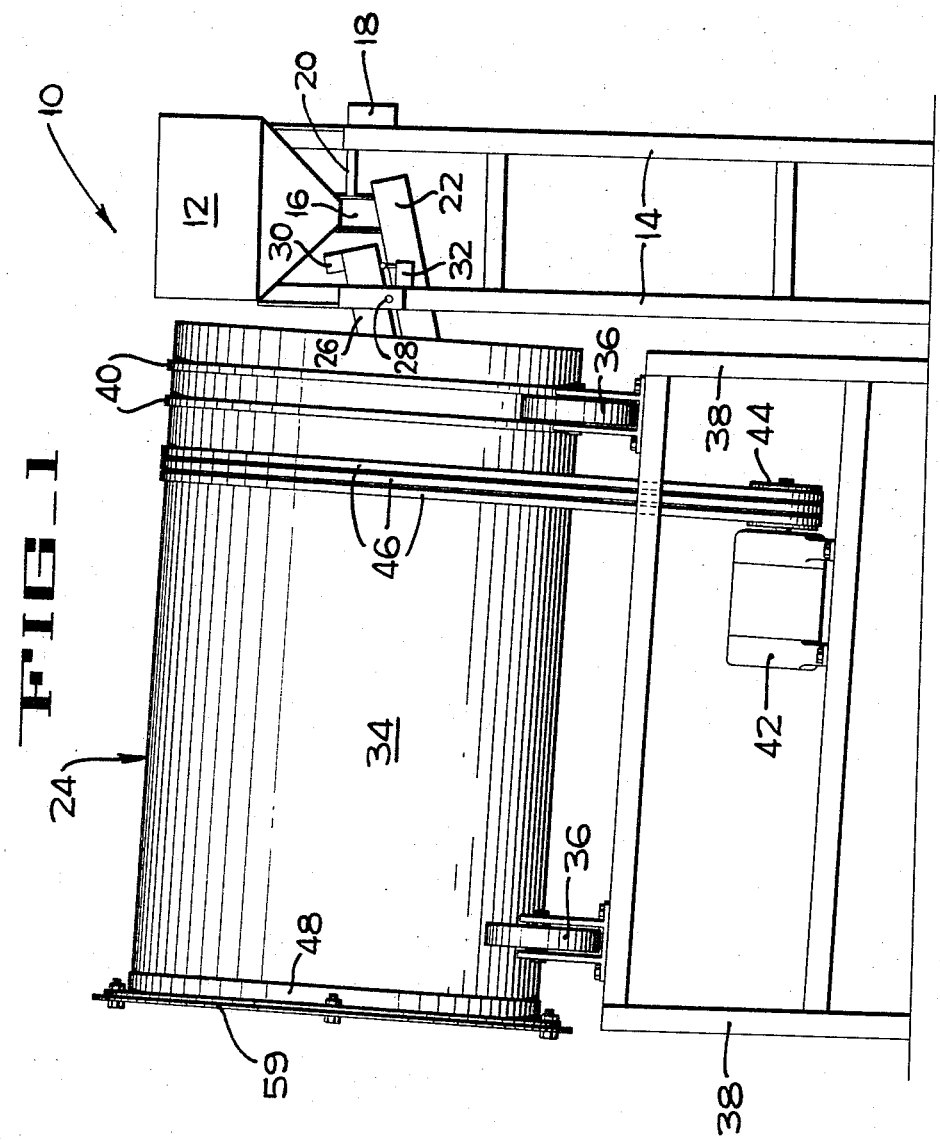
INVENTOR
KATSUJI HIRAHARA
BY *Hans G. Hoffmeister*
ATTORNEY

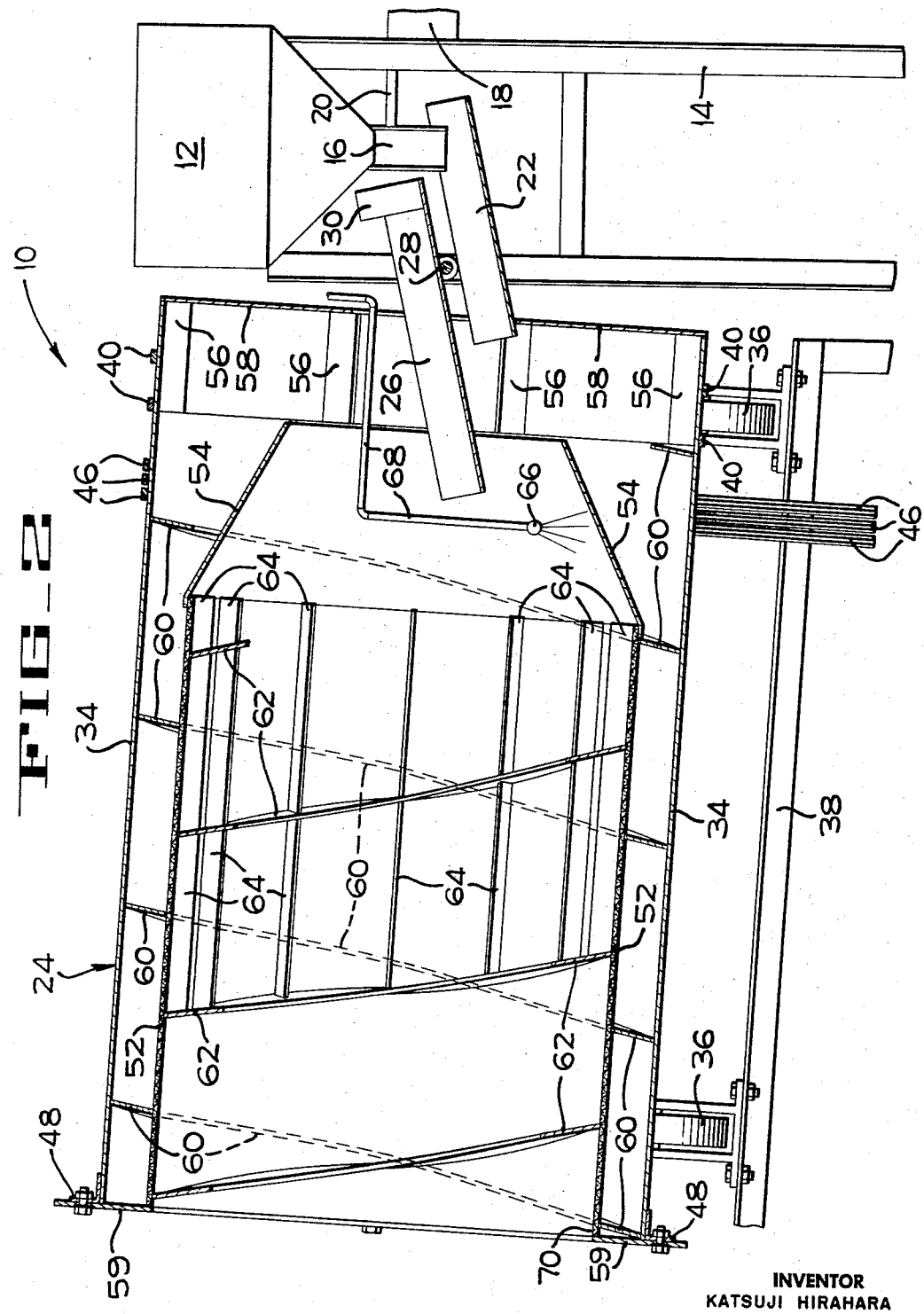

United States Patent Office 3,315,589
Patented Apr. 25, 1967

3,315,589
PELLET FORMING APPARATUS
Katsuji Hirahara, San Jose, Calif., assignor to FMC Corporation, San Jose, Calif., a corporation of Delaware
Filed Oct. 21, 1965, Ser. No. 499,173
8 Claims. (Cl. 99—235)

The present invention pertains to apparatus for forming pellets from granular material and a liquid binding agent.

Two of the by-products in a tallow and meat rendering system are a dry meal and a very viscous liquid protein commonly known as stickwater. It has recently been proposed to utilize the meal, enriched by the addition of stickwater, for a highly nutritious animal feed. A mixture of stickwater and meal is difficult to dry, however, due to the fact that, if the stickwater content is at the desired level, the mixture is a gummy mass which cannot readily be handled or dried because it clogs the usual processing machinery.

The present invention comprises apparatus wherein droplets of stickwater are introduced into dry meal to form pellet nuclei, after which the pellets are recirculated and gain more stickwater and meal until they are of some predetermined size and are automatically discharged from the apparatus to be dried or otherwise processed. A particular feature of the pellet forming apparatus is that the discharged pellets are relatively dry whereby the final drying operation can be efficiently handled by a conventional commercial dryer without the pellets sticking to each other or to the dryer.

One of the objects of the present invention is to provide improved apparatus for forming pellets of viscous liquid and granular material.

Another object of the invention is to provide improved apparatus for mixing dry and liquid materials and automatically forming uniform size pellets thereof.

Another object is the provision of pellet forming apparatus to form substantially dry, dense pellets.

Other objects and advantages of the present invention will become evident from the following description and from the accompanying drawings, wherein:

FIGURE 1 is a diagrammatic side elevation of the pellet forming apparatus.

FIGURE 2 is an enlarged, fragmentary, longitudinal section taken centrally through the pellet forming apparatus shown in FIGURE 1.

The pellet forming apparatus 10 (FIG. 1) is fed from an elevated supply hopper 12 which is mounted upon a floor-supported frame 14 and has an inclined discharge chute 16 secured to its lower end. Dried protein meal is supplied to the hopper by any conventional conveying means, not shown, and the meal gravitates into the discharge chute 16. The inclination of the discharge chute 16 is such that the meal is not free-flowing. A vibrator 18, such as a conventional electrically-energized vibrator, is mounted on the frame 14 and is connected by a link 20 to the chute 16. At selected times a control mechanism, later described, energizes the vibrator 18; the chute 16 is thus vibrated so that the meal becomes free-flowing and is discharged by gravity.

Mounted on the frame 14 under the discharge end of the discharge chute 16 is a fixed main supply chute 22 which has a lower discharge end that extends into a longitudinally inclined tumbling drum 24. Superposed above the main supply chute 22 is a recirculating chute 26 that is tiltably mounted upon a shaft 28 which is connected between vertical posts of the frame 14. The recirculating chute 26 is provided with a counterweight 30 which is effective, when the chute is empty, to tilt the chute clockwise about the axis of the shaft 28. In its clockwise tilted position, the recirculating chute contacts the actuator of an electrical switch 32 which thus closes its switch contacts and an electrical circuit, not shown, that controls the vibrator 18. Clockwise tilting of chute 26 is thereby effective to energize the vibrator 18 and cause more meal to be discharged from the hopper 12 into the main supply chute 22.

The tumbling drum 24 includes an outer, imperforate cylindrical shell 34 which is supported in a cradle of rollers 36 that mount the shell 34 for rotation about its longitudinal axis, and in an inclined plane. The rollers 36 are supported upon a floor-mounted frame 38 and the rollers adjacent the lower, inlet end of the shell 34 rotate between a pair of annular guide tracks 40 that are secured to the shell. The frame 38 also supports a gear head type of electric motor 42 which is provided with a multiple groove pulley 44. The pulley 44 is arranged to drive the tumbling drum clockwise, as viewed from its inlet end, by means of V-belts 46 that are trained around both the pulley 44 and the shell 34. An annular flange bracket 48 is secured to the upper, discharge end of the tumbling drum shell 34.

A drum 52 is mounted inside the cylindrical housing 34 and includes a foraminous cylindrical screen or drum of stock heavy enough to maintain its form. Welded to, and extending downwardly and inwardly from, the lower end of the screen 52 is an imperforate, frusto-conical wall 54 which encircles the discharge end of the recirculating chute 26 and terminates inwardly of the lower, inlet end of the tumbling drum shell 34. That portion of the wall 54 which intercepts meal dropped from the supply chute 26 thus declines toward the screen drum 52. Secured to the inner surface of the shell 34 as by welding, and also in encircling relation to the discharge end of the recirculating chute 26, as well as the discharge end of the main supply chute 22, are a plurality of radially extending, recirculating paddles 56. The function of the paddles 56 is to elevate material in the shell 34 and drop it into the recirculating chute 26. In order to prevent this material from entering the main supply chute 22, the recirculating chute 26 is wider than the open upper side of the supply chute and therefore shields the chute. The adjacent end of the tumbling drum 24 is substantially closed by an annular wall 58.

Interposed between the screen 52 and the shell 34 is a continuous helical conveyor blade 60 that is welded to the drum 52 and extends from the inner ends of the recirculating paddles 56 to an annular flange 59 which is secured to the end of the drum 52. The pitch of the conveyor blade 60 is such that when the tumbling drum 24 is being driven by the motor 42, material engaged by the blade is moved downward toward the inlet end of the shell, and between adjacent recirculating paddles 56 at the lower sector of the shell.

A second continuous helical conveyor blade 62 is welded to the inner surface of the screen 52, and is coextensive therewith. The conveyor blade 62 is effective to convey material upward toward the discharge end of the tumbling drum 24. Some of the convolutions of the helical conveyor blade 62 near the lower end of the screen 52 are interconnected by radial tumbling blades 64 that extend parallel to the axis of rotation of the tumbling drum.

The drum 52 is secured to the housing 34 by bolts that extend through the flange 59 and through the flange 48 of the housing 34.

Approximately mid-length of the frusto-conical wall 54 and, near the lower portion thereof, a spray nozzle 66 is held in fixed position by its fluid supply conduit 68. The conduit 68 extends outside the tumbling drum to a constant-pressure supply source of stickwater liquid and is prvided with fixed support means and a shut-off valve, not shown. The stickwater supply source may, of course, be a vessel in which animal fats and the like are rendered.

When the pellet forming apparatus 10 is initially placed in operation, the supply hopper 12 is supplied with relatively dry meal and the motor 42 is continuously energized. Since the recirculating chute 26 is empty, the counterweight 30 causes the chute to be tilted and the switch 32 is thus in a closed position maintaining the vibrator 18 energized. The dry meal pours from the chute 16 through the main supply chute 22 and onto the inner surface of the shell 34. The recirculating paddles 56 carry the meal to unsupported positions at the upper sector of the shell, and the meal thus falls onto the upper surface of the recirculating chute 26, is conveyed by the chute to the inside of the imperforate frusto-conical wall 54, and slides down the wall 54 into contact with the helical conveyor blade 62. As soon as the meal begins to be deposited on the frusto-conical wall 54, the stickwater liquid can be supplied to the spray nozzle 66.

Droplets of the stickwater, impinging the meal, cause a damp meal and stickwater pellet nucleus to be formed, to which more meal will adhere as the thus formed pellets begin their travel through the screen 52. The pellets, and of course the granules of meal, are at this time smaller than the apertures in the screen. Accordingly, the pellets and meal drop through the screen into the shell 34 and between convolutions of the helical conveyor blade 60. Gravity, plus the conveyor blade 60 causes the pellets and meal to move counter to their former direction of movement and into contact with the lower ones of the recirculating paddles 56. In connection with the conveyor blade 60, it should be noted that the blade can be dispensed with if the tumbling drum 24 is sufficiently inclined so that gravity will accomplish the same function.

The paddles convey the pellets and meal upward until they drop into the recirculating chute 26. The same cycle just described uninterruptedly repeats; the pellets and meal fall onto the frusto-conical wall 54 where the stickwater droplets from the spray nozzle 66 imping upon some of the pellets to further wet them, and upon some meal granules to form new nuclei. Being thus wetted, the pellets attract more meal and are thereby enlarged. Some of the pellets, however, are not yet firm because part of their outer layer of meal is loosely held by insufficient stickwater. Accordingly, although the pellets might be large enough to be temporarily supported by the screen 52, the outer meal layer soon flakes off and the pellets drop through the screen drum 52 and begin another recirculating cycle. Other pellets might be firm enough and large enough to be retained inside the screen drum, and the tumbling blades 64 carry these pellets upward until they become unsupported and drop. Thus, these dropped pellets are freed of loosely adhered outer layers of meal, and in addition may be somewhat compacted when they impinge the screen or other pellets below. The function of the tumbling blades 64, accordingly, is an important feature of the invention because the pellets are thereby tumbled and reduced in size until the pellets comprise only firmly adhered, stickwater dampened meal, and because the tumbling action causes a degree of compaction to the pellets.

After sufficient recirculating cycles to produce pellets which are firm and large enough to remain upon the screen 52, the pellets continue to be moved upward toward the discharge end of the tumbling drum 24 by the helical conveyor blade 62 and lose contact with the tumbling blades 64 at about midlength of the screen. These pellets are now fully formed and ready for discharge, having been in effect formed by thin layers of compacted meal adhered to the stickwater and meal nuclei with just the proper amount of stickwater to produce the desired high-level of protein stickwater content. Further, it will be evident that the pellets are uniform in moisture distribution because the stickwater premeates the meal and there cannot be any excess stickwater since it will attract more dry meal. The outer surfaces of the finally formed pellets are thus essentially dry, and can be fed into ordinary drying apparatus without sticking to each other or to the dryer. The pellet forming process is automatic and self-regulating due to the fact that the pellets recirculate in the tumbling drum 24 until they are of the desired size, a size too large to drop through the screen 52, and are then conveyed by the helical conveyor blade 62 over the upper discharge end 70 of the screen 52. The discharged pellets are collected upon a conventional conveyor, chute or the like, and are then moved into the drying apparatus to finish the production cycle, after which the pellets may be packed or otherwise processed.

It should be noted that the ratio of stickwater liquid to dry meal can be maintained very low because the pellet forming process does not depend upon exact initial admixtures of dry meal and stickwater which might produce sticky pellets if too much stickwater is used. Thus, an important feature of the pellet forming apparatus 10 is that excess dry meal is always present beneath the stickwater spray nozzle 66 so that the stickwater droplets cannot contaminate the machine.

While a particular embodiment of the pellet forming apparatus of the present invention has been herein shown and described, it will be apparent that modification and variation may be made without departing from the spirit of the invention, and that the scope of the invention should be limited only by proper interpretation of the claims appended hereto.

Having thus described the invention, that which is believed to be new, and for which protection by Letters Patent is desired, is:

1. Pellet forming apparatus comprising respectively perforate and imperforate inner and outer hollow cylinders, means mounting said cylinders for rotation about a common inclined axis, said cylinders defining therebetween an annular chamber arranged to receive pellets small enough to pass outward through the perforations in said inner cylinder and downward along the inclined interior surface of said outer cylinder, feed means for introducing random size pellets into said inner cylinder, and means including said feed means and carried by said outer cylinder for recirculating the pellets collected at the lower end of said chamber by reintroducing the pellets into said inner cylinder.

2. Pellet forming apparatus comprising an imperforate hollow cylindrical housing, means mounting said housing for rotation about its longitudinal axis, said housing having an inlet end and a discharge end elevated above said inlet end, a rotatable perforate drum mounted within said housing and having a frusto-conical inlet end adjacent the inlet end of said housing, a first helical conveyor interposed between said drum and said housing, a second helical conveyor mounted within said drum, said conveyors being respectively operable to convey material toward the inlet end and toward the outlet end of said housing, means for simultaneously rotating said housing and said drum, means for supplying granular material into said inlet end of said drum, and means for dispensing droplets of viscous liquid into said frusto-conical inlet end and onto the granular material therein, the liquid and granular material thus forming moist pellets which are conveyed inside the perforate drum by said second conveyor if larger than the perforations in the drum, and which if smaller are returned by said first conveyor to the inlet end of said housing.

3. In a pellet forming apparatus the combination comprising an imperforate outer hollow cylinder, a perforate hollow inner cylinder mounted substantially coaxially within said imperforate cylinder, means for rotating said inner and outer cylinders, a guide chute for introducing random size pellets into said inner cylinder, helical conveying means mounted between said inner and outer cylinders and rotatable with one of said cylinders, said conveying means being operable to convey pellets small enough to pass through the perforations in said inner cylinder toward said guide chute, and a recirculating paddle secured to the inner surface of said outer cylinder for orbital movement about said guide chute whereby the small pellets are lifted by said paddle and deposited in said guide chute for recirculation through said inner cylinder.

4. Pellet forming apparatus comprising an imperforate cylindrical housing, means mounting said housing for rotation about its longitudinal axis, said housing having an inlet end and a discharge end, a perforate drum mounted coaxially within said housing and having an imperforate frusto-conical inlet end converging toward and lying within the inlet end of said housing, a first helical conveyor blade interposed between said drum and said housing, a second helical conveyor blade mounted on the inner surface of said drum, said conveyors being respectively operable to convey material toward the inlet end and toward the outlet end of said housing, means for rotating said housing and said drum, means for supplying granular material to said inlet end of said drum, and means for dispersing droplets of viscous liquid into said frusto-conical inlet end and onto the granular material therein.

5. Pellet forming apparatus comprising inner and outer cylindrical members mounted for simultaneous rotation about a common longitudinal axis, said members being respectively perforate and imperforate, means for introducing pellets into said inner member adjacent one end thereof, first conveying means mounted inside said inner member for moving the pelelts in a first direction toward the opposite end of said member, second conveying means mounted between said inner and outer members and operable to move pellets small enough to pass outwardly through the perforations in said inner member in a direction counter to said first direction of pellet movement, and pellet recirculating means including a third conveyor mounted within said outer cylindrical member and including said pellet introducing means for re-introducing the small pellets into said inner cylindrical member.

6. In pellet forming apparatus the combination comprising a perforate drum, means mounting said drum for rotation about its longitudinal axis, said drum having an inlet end, a discharge end and an imperforate frusto-conical wall converging away from said inlet end, a helical conveyor mounted on the inner surface of said drum and operable to convey material supported within the drum toward said outlet end, means for rotating said drum, means for supplying granular material onto the inner surface of said frusto-conical wall, and means for supplying viscous liquid droplets onto the granular material lying on said wall, the liquid and granular material thus forming pellets which are conveyed inside the drum by said conveyor if larger than the perforations in the drum.

7. Pellet forming apparatus comprising an imperforate hollow cylindrical housing mounted for rotation about its longitudinal axis and having an inlet end and an outlet end elevated above said inlet end, a perforate drum mounted coaxially within said housing, said drum extending form said outlet end partially through said housing and cooperatively defining with the housing an annular chamber, a plurality of inwardly projecting paddles secured to the inner wall of said housing adjacent said inlet end, a frusto-conical wall having its large end secured to said drum and its small end positioned adjacent the inner ends of said paddles, a declining recirculating chute circumscribed by said paddles and having a discharge end and disposed within said frusto-conical wall, a first helical conveyor disposed in said annular chamber and operative to convey materials toward said inlet end of the housing, a second helical conveyor mounted on the inner surface of said drum and operative to convey material away from said inlet end of said housing, and means for feeding granular material and droplets of liquid into the areas of the housing circumscribed by said paddles.

8. Pellet forming apparatus comprising means for dispensing liquid into dry meal to form wetted particles of meal, a rotary drum having a pellet discharge mouth, and an inlet mouth arranged to receive dry meal and wetted particles of meal, said drum providing means for tumbling the dry and wet meal to form small masses of meal, means for advancing the meal longitudinally along said drum toward said discharge mouth, means defining openings in said drum of a size to pass particles of meal and masses of meal that are smaller than a predetermined size, and means for recycling the particles of meal and small masses of meal that pass through said drum openings along a path past said liquid dispensing means for redelivery to said rotary drum.

References Cited by the Examiner

UNITED STATES PATENTS

| | | | |
|---|---|---|---|
| 1,877,266 | 9/1932 | Chapin et al. | 99—235 |
| 1,973,812 | 9/1934 | Johnson | 259—14 |
| 2,597,442 | 5/1952 | Borrow | 99—235 |
| 2,630,123 | 3/1953 | Womack | 99—235 X |
| 3,101,040 | 8/1963 | Lanz | 99—235 |

WALTER A. SCHEEL, *Primary Examiner.*
ROBERT W. JENKINS, *Examiner.*